US008467771B2

(12) United States Patent
Tamura et al.

(10) Patent No.: US 8,467,771 B2
(45) Date of Patent: Jun. 18, 2013

(54) SERVER APPARATUS AND MESSAGE TRANSMISSION METHOD

(75) Inventors: Motoshi Tamura, Zushi (JP); Masami Yabusaki, Kashiwa (JP); Chikako Tsukada, Shinagawa-ku (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 273 days.

(21) Appl. No.: 12/810,787

(22) PCT Filed: Dec. 24, 2008

(86) PCT No.: PCT/JP2008/073400
§ 371 (c)(1),
(2), (4) Date: Jun. 25, 2010

(87) PCT Pub. No.: WO2009/084528
PCT Pub. Date: Jul. 9, 2009

(65) Prior Publication Data
US 2010/0273455 A1    Oct. 28, 2010

(30) Foreign Application Priority Data

Dec. 27, 2007    (JP) ................. 2007-335747

(51) Int. Cl.
*H04M 1/725*    (2006.01)
(52) U.S. Cl.
USPC ...... 455/412.2; 455/566; 370/352; 379/88.13; 709/200; 709/219
(58) Field of Classification Search
USPC ............. 455/412.2, 566; 370/352; 379/88.13; 709/219, 200
See application file for complete search history.

(56) References Cited

U.S. PATENT DOCUMENTS

| 6,487,239 | B1 * | 11/2002 | Goto et al. | 375/219 |
| 6,873,861 | B2 * | 3/2005 | Awada et al. | 455/566 |
| 7,062,026 | B1 | 6/2006 | Okano | |
| 7,072,651 | B2 | 7/2006 | Jiang et al. | |
| 7,925,717 | B2 * | 4/2011 | Chou et al. | 709/219 |

(Continued)

FOREIGN PATENT DOCUMENTS

| JP | 05-160911 A | 6/1993 |
| JP | 06-284205 A | 10/1994 |

(Continued)

OTHER PUBLICATIONS

"IP multimedia—a new era in communication", Nokia white paper, all pages, 2004.*

(Continued)

*Primary Examiner* — Lester Kincaid
*Assistant Examiner* — Isaak R Jama
(74) *Attorney, Agent, or Firm* — Crowell & Moring LLP

(57) ABSTRACT

There are provided a server apparatus capable of transmitting any message in a flexible manner at various timings of communication service states, and a message transmission method thereof. When a communication trigger detector 103 of an IMS 100 detects a trigger point, a determination portion 104 determines a massage to be transmitted based upon at least one of a type of the communication service state, a transmission destination of the message, presence information, and an instruction input. A message transmitter 105 give an instruction to an information storage device 300 to transmit the message to be transmitted that has been determined, and the information storage device 300 transmits the message to the transmission destination.

9 Claims, 9 Drawing Sheets

U.S. PATENT DOCUMENTS

| | | | |
|---|---|---|---|
| 2001/0005826 A1 | 6/2001 | Shibuya | |
| 2003/0110081 A1 | 6/2003 | Tosaki et al. | |
| 2005/0198096 A1* | 9/2005 | Shaffer et al. | 709/200 |
| 2007/0047523 A1* | 3/2007 | Jiang | 370/352 |
| 2007/0263798 A1* | 11/2007 | Dewing et al. | 379/88.13 |

FOREIGN PATENT DOCUMENTS

| | | | |
|---|---|---|---|
| JP | 2001-103132 A | 4/2001 | |
| JP | 2001-186276 A | 7/2001 | |
| JP | 2002-354127 A | 12/2002 | |
| JP | 2003-101645 | 4/2003 | |
| JP | 2003-101645 A | 4/2003 | |
| JP | 2003-152869 A | 5/2003 | |
| JP | 2005-244418 | 9/2005 | |
| JP | 2005-244418 A | 9/2005 | |
| JP | 2007-306192 A | 11/2007 | |
| WO | WO 2006/130783 A2 | 12/2006 | |
| WO | WO 2007/086747 A2 | 8/2007 | |

OTHER PUBLICATIONS

PCT/JP2008/073400 PCT/IB/338.
PCT/JP2008/073400 PCT/IB/373.
PCT/JP2008/073400 PCT/ISA/237 (Translation).
Chinese Office Action (w/English translation), dated Jul. 3, 2012, 11 pages.
Japanese Office Action (w/English translation), dated Jul. 24, 2012, 4 pages.
European Search Report, dated Oct. 15, 2012, 5 pages.
Japanese Office Action (w/English translation), dated Dec. 11, 2012, 6 pages.

* cited by examiner

FIG. 3

| CALLER ID | OUT OF SERVICE AREA | TALKING | HOLD TO ANSWER |
|---|---|---|---|
| TELEPHONE NUMBER T001 | MESSAGE ID 01 | MESSAGE ID 05 | MESSAGE ID 04 |
| TELEPHONE NUMBER T002 | MESSAGE ID 02 | NO SETTING (RINGING) | MESSAGE ID 05 |
| TELEPHONE NUMBER T003 | MESSAGE ID 03 | MESSAGE ID 03 | MESSAGE ID 03 |
| . . . | | | |

FIG. 4

| COMMUNICATION SERVICE STATE | | WHEN CALLEE MS ANSWERS | | | TALKING | |
|---|---|---|---|---|---|---|
| | PRESENCE INFORMATION OF CALLEE | ATTENDING A MEETING | MOVING | SLEEPING | APPROACHING A TUNNEL | START TIME OF MEETING |
| CALLER ID | TELEPHONE NUMBER T001 | MESSAGE ID 01 | MESSAGE ID 03 | MESSAGE ID 05 | MESSAGE ID 06 | MESSAGE ID 08 |
| | TELEPHONE NUMBER T002 | NO SETTING (RINGING) | MESSAGE ID 03 | NO SETTING (RINGING) | MESSAGE ID 07 | MESSAGE ID 08 |
| | TELEPHONE NUMBER T003 | MESSAGE ID 02 | MESSAGE ID 04 | MESSAGE ID 05 | MESSAGE ID 07 | MESSAGE ID 09 |

*F I G. 5*

| GROUP NUMBER | TERMINAL ID |
|---|---|
| G1111 | TELEPHONE NUMBER T001 |
|  | TELEPHONE NUMBER T002 |
|  | TELEPHONE NUMBER T003 |
| G2222 | TELEPHONE NUMBER T001 |
|  | TELEPHONE NUMBER T004 |
| G3333 | TELEPHONE NUMBER T002 |
|  | TELEPHONE NUMBER T005 |
|  | TELEPHONE NUMBER T006 |

SERVER APPARATUS AND MESSAGE TRANSMISSION METHOD

TECHNICAL FIELD

The present invention relates to a server apparatus that transmits messages and a message transmission method.

BACKGROUND ART

Conventionally, as an example for utilizing information stored by users for communication, there are answering messages of answering machine services. The answering machine service is provided for transmitting to a caller terminal an answering message that has been recorded beforehand by the user of a callee terminal for the sake of the user of the callee terminal, when the callee terminal is not capable of answering a call from the caller terminal (for example, JP 2001-103132 A).

DISCLOSURE OF THE INVENTION

Problem to be Solved by the Invention

It is to be noted that, however, such a message transmission mechanism in the answering machine service is specialized for the answering machine services, so the message is transmitted only at a specific timing or condition. Therefore, there is no consideration for the flexibility in the timing when the message is transmitted or the flexibility in selectively transmitting a message corresponding to the communication counterpart from among multiple messages. Users are not able to transmit the messages in a flexible manner in accordance with the communication counterpart and various communication service states such as the time when the call is originated, when the call is received, when talking on the telephone, and the like.

The present invention has been made to solve the problems of the conventional arts, and it is an object of the present invention to provide a server apparatus that transmits any messages in a flexible manner at various timings of the communication service states and a message transmission method thereof.

Means for Solving the Problem

According to the present invention, there is provided a service apparatus comprising: a storage device that stores a message; a communication trigger detector that detects a generation of a communication service state that is an opportunity of message transmission in the course of call processing; a determination portion that determines, when the generation of the communication service state is detected by the communication trigger detector, a message to be transmitted based upon at least one of a type of the communication service state that has been detected, a transmission destination of the message, presence information representing a state of one of a caller and a communication counterpart of the caller, and an instruction input from one of the caller and the communication counterpart of the caller; and a message transmitter that transmits the message to be transmitted that has been determined by the determination portion from the storage device.

With such a configuration, when the generation of the communication service state that is an opportunity of message transmission is detected in the course of call processing, the server apparatus determines for transmission a message to be transmitted to a transmission destination based upon at least one of the type of the communication service state that has been detected, the transmission destination of the message, the presence information, and the instruction input. It is therefore made possible to transmit any message in a flexible manner at various timings of the communication service states.

According to a preferred aspect, the service apparatus may further comprise a message transmission condition memory portion that stores a determination condition for determining the message to be transmitted based upon at least one of the type of the communication service state, the transmission destination of the message, and the presence information, wherein the determination portion determines the message to be transmitted based upon the determination condition stored in the message transmission condition memory portion.

With such a configuration, the determination condition for determining the message to be transmitted is stored beforehand in the message transmission condition memory portion. This allows users to transmit the messages automatically in accordance with the type of the communication service state, the transmission destination of the message, the present information, or the like, without making an instruction input successively.

According to another preferred aspect, the service apparatus may further comprise a transmission destination group memory portion that stores a group identifier for identifying a group in association with either a plurality of user identifiers or a plurality of terminal identifiers for identifying communication terminals, wherein information input by the instruction input includes a message identifier for identifying the message to be transmitted and the group identifier, and wherein the message transmitter transmits the message to a communication terminal identified by either a user identifier or a terminal identifier, which are stored in the transmission destination group memory portion in association with the group identifier included in the information input by the instruction input.

With such a configuration, a user is able to transmit the message to multiple communication terminals by designating the group identifier at the time of making an instruction input. This eliminates the necessity of successively input for transmitting the message.

According to further another preferred aspect, the information input by the instruction input may include either at least one user identifier or at least one terminal identifier that has been designated by a user, as a transmission destination, and the message transmitter may transmit the message to the communication terminal identified by either the user identifier or the terminal identifier.

This allows users to designate the transmission destinations of the message in a flexible manner depending on the situation.

According to yet another preferred aspect, the communication service state that is the opportunity of the message transmission may be a state where the communication terminal of the caller and the communication terminal of the communication counterpart of the caller are communicating with each other.

According to yet another preferred aspect, the communication service state that is the opportunity of the message transmission may be a state where the communication terminal of the communication counterpart of the caller answers a telephone call from the communication terminal of the caller.

According to yet another preferred aspect, the communication service state that may be the opportunity of the message transmission is a state where the communication between the communication terminal of the caller and the communication terminal of the communication counterpart of the caller is disconnected.

According to yet another preferred aspect, the transmission destination of the message may be the communication terminal of the communication counterpart of the caller.

Moreover, according to the present invention, there is provided a message transmission method comprising: detecting by a server apparatus a generation of a communication service state that is an opportunity of message transmission in the course of call processing; when the generation of the communication service state is detected in the detecting, determining by the server apparatus a message to be transmitted based upon at least one of a type of the communication service state that has been detected, a transmission destination of the message, presence information representing a state of one of a caller and a communication counterpart of the caller, and an instruction input from one of the caller and the communication counterpart of the caller; and transmitting by the server apparatus the message to be transmitted that has been determined by the determining, from a storage device.

Effects of the Invention

According to the present invention, when the generation of the communication service state that is an opportunity of message transmission is detected in the course of call processing, a server apparatus determines for transmitting a message to be transmitted to a transmission destination based upon at least one of the type of the communication service state that has been detected, the transmission destination of the message, the presence information, and the instruction input. It is therefore made possible to transmit any message in a flexible manner at various timings of the communication service states.

BRIEF DESCRIPTION OF DRAWINGS

FIG. 3 is a view illustrative of an example of a table stored in a message transmission condition memory portion in accordance with an embodiment of the present invention;

FIG. 4 is a view illustrative of an example of a table stored in a message transmission condition memory portion in accordance with an embodiment of the present invention;

FIG. 5 is a view illustrative of an example of a table stored in a transmission destination group memory portion in accordance with an embodiment of the present invention;

EXPLANATION OF REFERENCES

Figure 1:
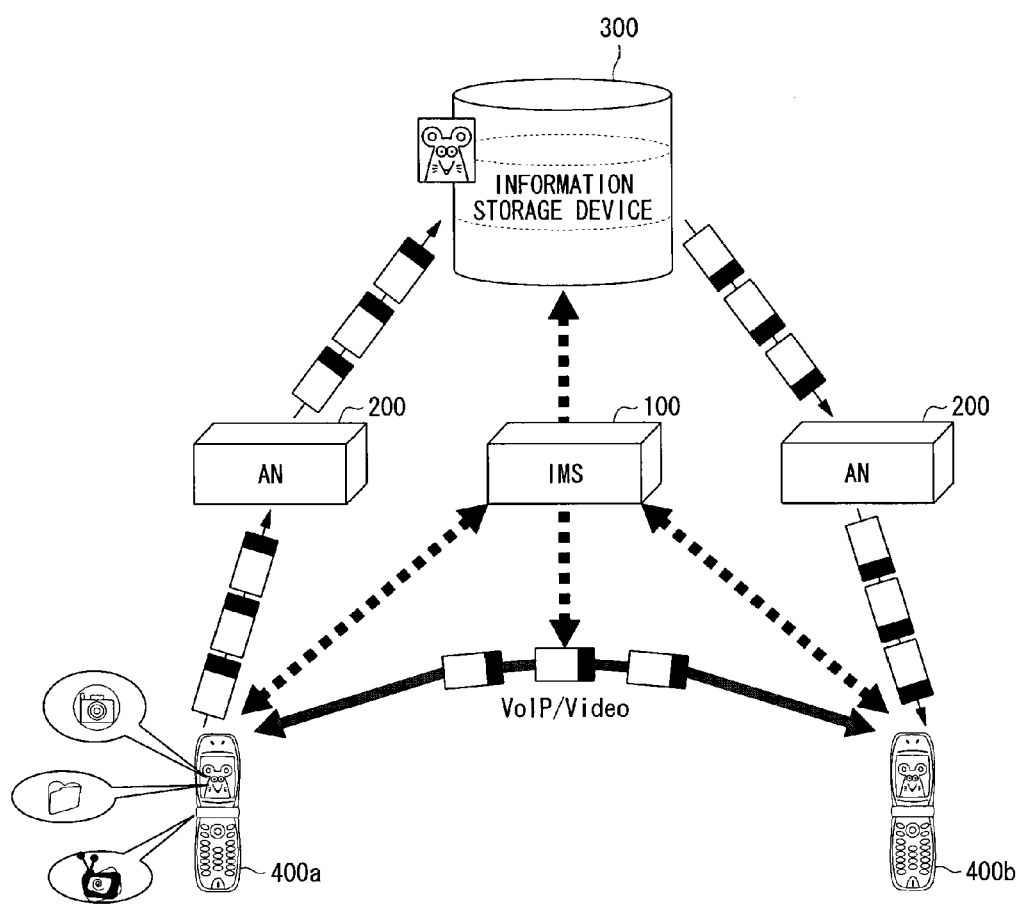
FIG. 1 is a view illustrative of the overall configuration of a communication network in accordance with an embodiment of the present invention.

100 IMS
101 message transmission condition memory portion
102 transmission destination group memory portion
103 communication trigger detector
104 determination portion
105 message transmitter
200 AN
300 information storage device
400a caller terminal
400b callee terminal

BEST MODE FOR CARRYING OUT THE INVENTION

Hereinafter, embodiments of the present invention will be described with reference to the drawings. In each of the drawings to be referred to in the following description, the same components and configurations as those employed in other drawings have the same reference numerals.

(Overall Configuration)

FIG. 1 is a view illustrative of the overall configuration of a communication network according to an embodiment of the present invention. As illustrated in FIG. 1, the communication network includes: a packet switching center including an IMS (IP Multimedia Subsystem) 100 and ANs (Access Nodes) 200; a communication system including an information storage device 300 that stores various messages; a caller terminal 400a; and a callee terminal 400b, the caller terminal 400a and the callee terminal 400b communicating with each other via the communication system.

Each of the above apparatuses is provided with: a CPU (Central Processing Unit); a storage device such as a memory or hard disk for storing software such as communication processing programs and data; and a communication interface, which are not illustrated.

(Configuration of IMS)

Figure 2:
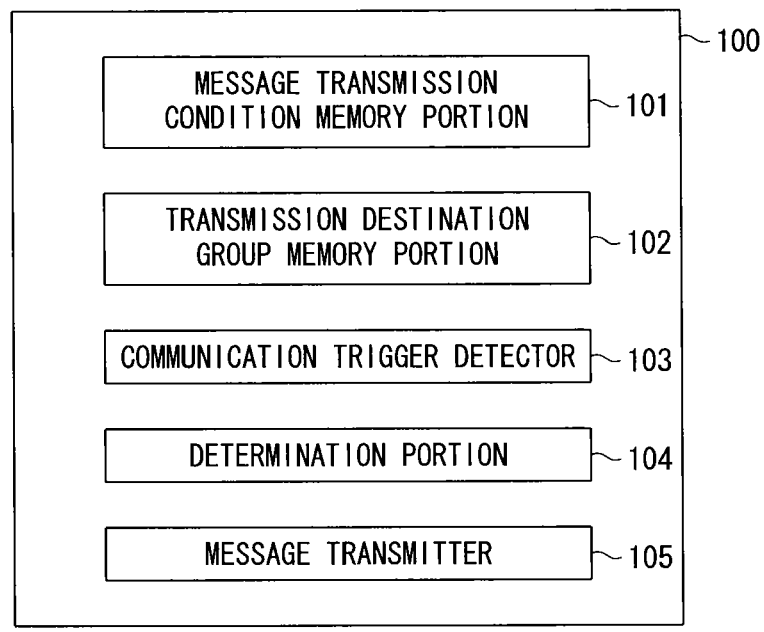
FIG. 2 is a block diagram illustrative of a functional configuration of an IMS in accordance with an embodiment of the present invention.

FIG. 2 is a block diagram illustrative of a functional configuration of the IMS 100. As illustrated in FIG. 2, the IMS 100 is provided with: a message transmission condition memory portion 101; a transmission destination group memory portion 102; a communication trigger detector 103; a determination portion 104; and a message transmitter 105. The message transmission condition memory portion 101 and the transmission destination group memory portion 102 are composed of a storage device for storing data. The communication trigger detector 103, the determination portion 104, and the message transmitter 105 are functions enabled by the CPU of the IMS 100 executing communication processing programs.

The message transmission condition memory portion 101 stores a determination condition for determining a message to be transmitted, based upon at least one of the type of the communication service state generated in the course of call processing, the transmission destination of the message, presence information representing the state of a caller or a communication counterpart of the caller (hereinafter, "the communication counterpart of the caller" will be referred to as "callee").

Herein, "the communication service state generated in the course of call processing" includes, for example, the caller terminal 400a is calling the callee terminal 400b, the callee terminal 400b is out of a service area at the time of call origination, the answering machine service is connected, the callee terminal 400b stays within a service area at the time of call origination but does not answer the call, the callee terminal 400b is performing communication at the time of call origination, the callee terminal 400b answers a call at the time of call origination, the caller terminal 400a and the callee terminal 400b are talking with each other on the telephone, at the time of disconnection, and the like. Additionally, the "presence information" denotes a user's state that can be determined by a network based upon the communication processing state, and includes, for example, information representing a user's state such as "attending a meeting", "moving", "sleeping", and the like, information on staying within a service area obtained by location registration or the like of a mobile communication terminal, location information obtained by the measurement with GPS (Global Positioning System), ON/OFF information of the power of a mobile communication terminal, information on the detection of operation for communication on a mobile communication terminal, information on a sensor cooperatively working with a mobile communication terminal, and the like.

FIG. 3 and FIG. 4 illustrate examples of tables stored in the message transmission condition memory portion 101. FIG. 3 is a table in which the type of the communication service state, a caller ID, and a message ID are associated with each other. This table is provided for determining a message to be transmitted to the caller terminal 400a of the caller, in accordance with the communication service state that has been detected and who the caller is (that is, the caller ID, herein, the telephone number of the caller terminal 400a).

Also, FIG. 4 is a table in which the type of the communication service state, the caller ID, and the presence information of a callee are associated with each other. This table is provided for determining a message to be transmitted to the caller terminal 400a of the caller, in accordance with the communication service state that has been detected, the current state of the callee, and who the caller is.

However, the tables stored in the message transmission condition memory portion 101 are not limited to the above examples. For instance, there may be provided a table in which the communication service state, the callee ID, and the presence information of the caller are associated with each other. Alternatively, there may be provided a table for determining the message to be transmitted in accordance with the type of the communication service state only.

Furthermore, when a determination condition is registered in the above tables, the determination condition is transmittable via a communication network from the communication terminal to the IMS 100, by use of SS (supplementary service) signals, HTTP (Hyper Text Transfer Protocol) or XCAP (XML configuration access protocol) signals, or the like.

The transmission destination group memory portion 102 stores a group number in association with telephone numbers (MSISDN, TEL URI, SIP URI) or terminal identifiers (IMSI) that are IDs of communication terminals. FIG. 5 illustrates an example of a table stored in the transmission destination group memory portion 102. This table is used for transmitting a message to each of the communication terminals identified by multiple telephone numbers or the terminal identifiers corresponding to the group number, when a group number is included in a message transmission instruction signal received from the caller terminal 400a.

The communication trigger detector 103 detects the generation of the communication service state, which is an opportunity of message transmission in the course of call processing. Hereinafter, such an opportunity will be referred to as "trigger point". The trigger point can be preset by use of a communication processing program or database.

When the communication service state that is a trigger point is detected by the communication trigger detector 103, the determination portion 104 determines a message to be transmitted base upon at least one of the type of the communication service state that has been detected, the transmission destination of the message, the present information of an caller or a callee, and an instruction input from the caller or the callee. Herein, according to the present embodiment, assuming that the user's "presence information" is managed by the AN 200 where the user terminal stays. Incidentally, the presence information may be managed in the IMS 100.

In order to transmit the message to the transmission destination, the message transmitter 105 transmits to the information storage device 300 a message transmission instruction signal including the ID of a message to be transmitted that has been determined by the determination portion 104 and the telephone number or terminal identifier of the transmission destination. Specifically, when the message transmission instruction signal that has been received includes a group number, the message transmitter 105 refers to the transmission destination group memory portion 102 to determine the message transmission destination corresponding to the group number, and then generates the message transmission instruction signal.

(Configuration of Information Storage Device)

The information storage device 300 includes a database that stores multiple messages. The database stores a message ID and the content of the message in association with each other. The types of the messages to be stored include a voice message, an image message, a message in a file format, and the like.

Upon receipt of the message transmission instruction signal from the IMS 100, the information storage device 300 reads out a message corresponding to the message ID included in the message transmission instruction signal from the database, and then transmits the message that has been read to the message transmission destination identified by the telephone number or the terminal identifier included in the message transmission instruction signal.

Specifically, as a method of storing the messages in the information storage device 300, an example is that after a communication path from the communication terminal to the information storage device 300 is set up, the voice message, the image message, the message in a file format, or the like acquired by talking on the telephone, imaging, uploading the file, or the like is transmitted to the information storage device 300 from the communication terminal. Moreover, these messages can be created by the user himself/herself, or messages prepared beforehand by an operator or service provider can be downloaded. As a means for the operator or service provider preparing and storing the messages beforehand, a procedure of "melody call" (registered trademark) or the like can be utilized.

The messages are registered by users or by an operator or service provider, depending on the purpose of the message to be used. That is, the messages to be transmitted by the user by the user's will are registered by the user, whereas the messages to be transmitted by the operator or service provider are registered by the operator or the service provider.

As to an instruction input for the determination means that determines the message to be transmitted, the instruction can be superimposed on a SETUP signal in the CC signal of ISUP/BISUP/mobile communication or an INVITE signal in SIP, or the like, at the start of the communication, that is during the ringing period. Also, the instruction can be superimposed on a call hold signal, PB signal, Reinvite, Option signal, termination and disconnection signal, or the like during the communication period or at the time of disconnection, after the communication path is set up.
(Configuration of AN)

The AN 200 performs packet signal switching, manages the information on mobile communication terminals staying within service areas or the presence information of the mobile communication terminals, and controls reception of messages between the mobile communication terminals.

The storage of the AN 200 is provided with a presence DB (DataBase). In the presence DB, the presence information on the users of the mobile communication terminals staying within its service area is managed. The presence information is obtained by the user manually registering the information, or is obtained by the AN 200 automatically registering, on successive receipt of the information on its service area obtained by the location registration of the mobile communication terminals or the like, the location information obtained by the measurement with GPS (Global Positioning System), ON/OFF information of the powers of the mobile communication terminals, the information on the detection of operation for communication on the mobile communication terminals, the information on the sensor cooperatively working with the mobile communication terminals, or the like. The (manual or automatic) registration and management of the presence and the detection of a change in the presence based upon the notification of the change in the presence can be accomplished in accordance with the specifications of Presence_SIMPLE and the like of OMA (Open Mobile Alliance).
(Configuration of Caller Terminal and Callee Terminal)

The caller terminal 400*a* and the callee terminal 400*b* are mobile communication terminals that enable data transmission and reception of data such as voices, images, files, and the like. In the memories of the caller terminal 400*a* and the callee terminal 400*b*, telephone directory data in which lists of telephone numbers and user names are recorded is stored. The caller terminal 400*a* and the callee terminal 400*b* each have a function of displaying a list of the transmission destinations for selecting the transmission destination of the message based upon the telephone directory data, and transmitting a message transmission instruction signal including the telephone number of the selected transmission destination, when one or more transmission destinations are selected from the list of the transmission destinations.
(Trigger Point and Example of Message to be Transmitted)

Figure 6:
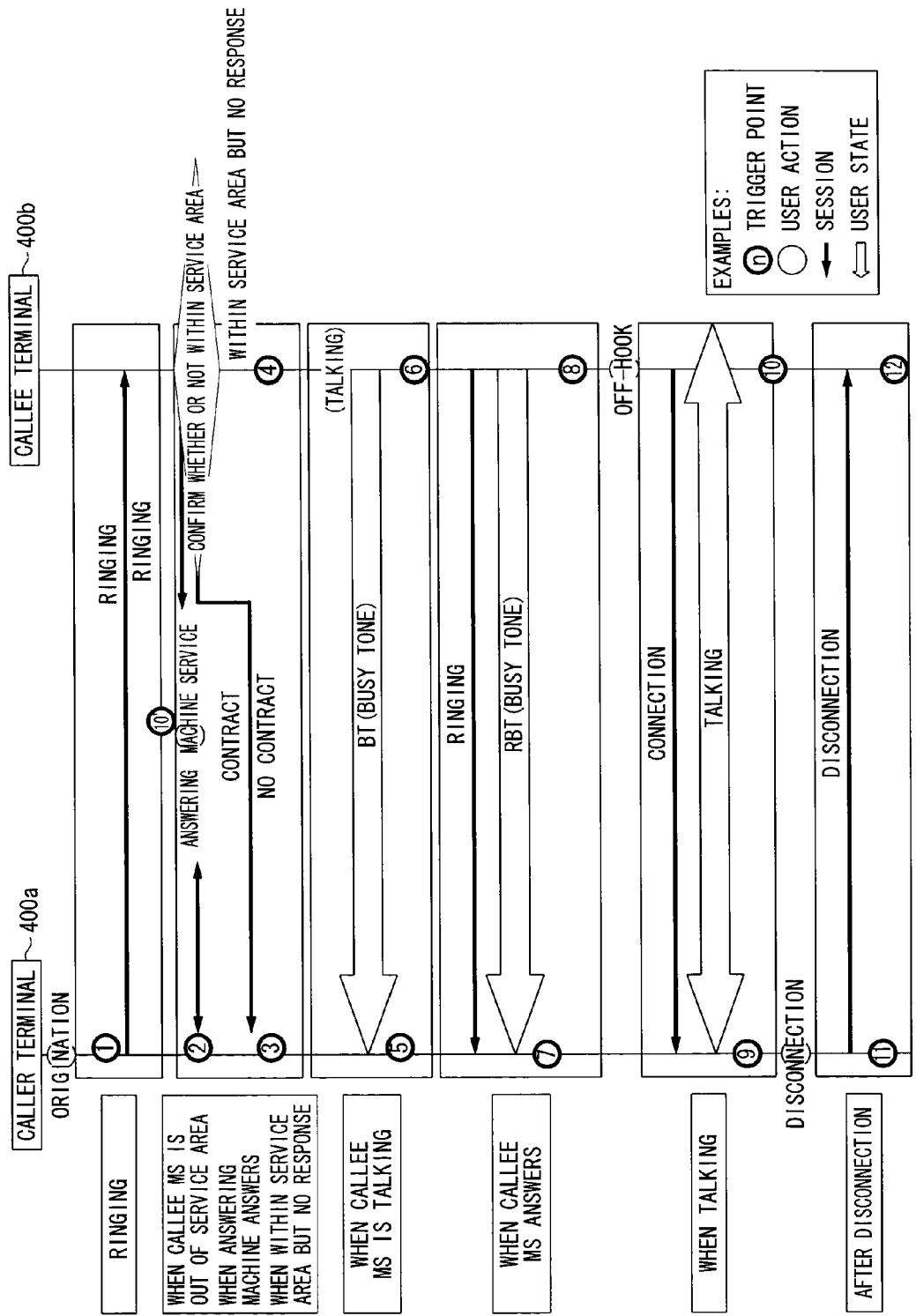
FIG. 6 is a view for describing an example of trigger points and messages to be transmitted at the trigger points in accordance with an embodiment of the present invention.

Referring now to FIG. 6, a description will be given of various trigger points that are opportunities of message transmission and examples of messages to be transmitted at the trigger points. Herein, each number in a circle represents a trigger point identified by the number.

The communication service state of a trigger point 1 is "while ringing". As an opportunity of this trigger point, a message (an example is that "I cannot answer the telephone, because I am attending a meeting") instead of a busy tone is transmitted to the caller terminal 400*a*.

The communication service state of a trigger point 2 is "when the answering machine is connected". As an opportunity of this trigger point, for example, an answering machine response message is transmitted to the caller terminal 400*a*. In response thereto, the caller's message is recorded.

The communication service state of a trigger point 3 is "when the callee MS (Mobile Station) is out of the service area", which means that the callee terminal 400*b* is out of the service area at the time of origination. If the user of the callee terminal 400*b* has not made a contract of the answering machine service, as an opportunity of this trigger point, for example, a message of "I am out of a service area" is transmitted to the caller terminal 400*a*.

Figure 7:
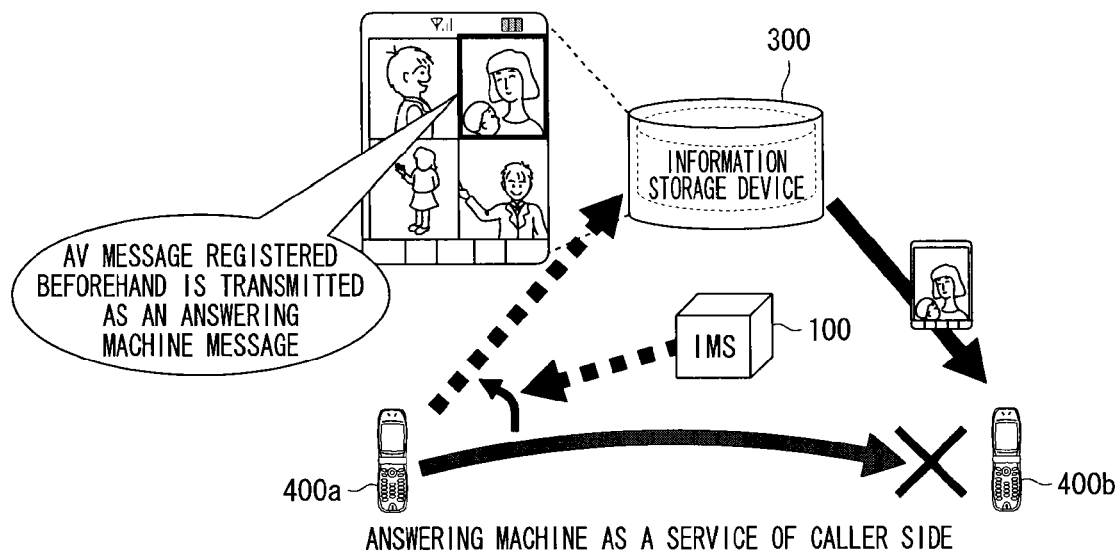
FIG. 7 is a view illustrative of a message transmission example at a trigger point 4 in accordance with an embodiment of the present invention.

The communication service state of a trigger point 4 is "no response within a service area", which means that the callee terminal 400*b* stays within a service area at the time of call origination, but makes no response. As an opportunity of this trigger point, for example, a message registered beforehand is transmitted to the callee terminal 400*b* (see FIG. 7). Preferably, the message to be transmitted in this case is a message in a file format that can be received without off-hook. Such a message service can be used for, for example, emergency telephone calling trees or informing of whether or not an event such as an excursion or the like will be held. Additionally, regarding the message to be transmitted, it is possible to refer to the presence information of the caller (or callee) and then determine the message to be transmitted to the callee terminal 400*b* (or caller terminal 400*a*) in accordance with the place, state, mood, or the like of the caller (or callee).

The communication service state of a trigger point 5 is "when the callee MS is busy", which means that the callee of the callee terminal 400*b* is talking on the telephone. As an opportunity of this trigger point, for example, the message of "Now I am talking on the telephone. Please call me again" is transmitted to the caller terminal 400*a*.

The communication service state of a trigger point 6 is also "when the callee MS is busy". As an opportunity of this trigger point, for example, a message of "There is a telephone call from Mr. A" is superimposed and then transmitted to the callee terminal 400*b* that is being used by the callee who is talking.

The communication service state of a trigger point 7 is "when the callee MS answers". As an opportunity of this trigger point, for example, a message of music or the like instead of a telephone ring is transmitted to the caller terminal 400*a*.

The communication service state of a trigger point 8 is also "when the callee MS answers". As an opportunity of this trigger point, the message of "Please answer the telephone quickly" is transmitted to the callee terminal 400*b*.

The communication service state of a trigger point 9 is "at the time of talking on the telephone". As an opportunity of this trigger point, a message is transmitted to the caller terminal 400*a*.

The communication service state of a trigger point 10 is also "at the time of talking on the telephone". As an opportunity of this trigger point, a message is transmitted to the callee terminal 400*b*.

For example, at "the time of talking on the telephone", when the presence of the caller (or callee) changes to "out of a service area" or "another application is activated", it is possible to transmit the message in response to the content of the presence to the callee terminal 400*b* (or the caller terminal 400*a*). In this case, the determination portion 104 detects that there is a change in the presence of the caller (or callee) and the presence condition for message transmission is achieved, then determines the transmission message, and gives an instruction to the message transmitter 105. Thereby, the message is transmitted.

Figure 8:
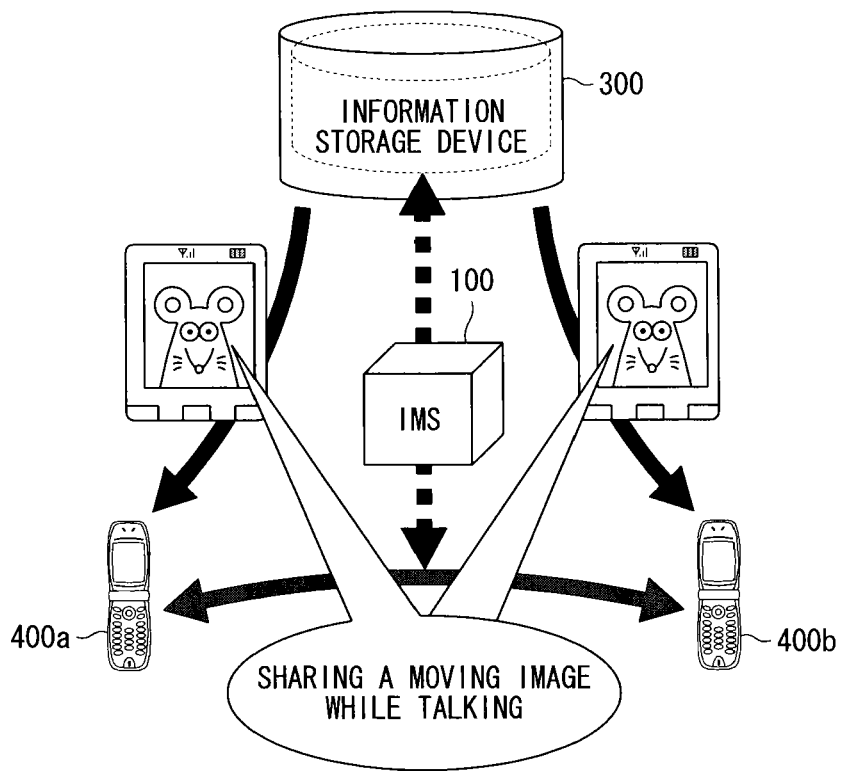
FIG. 8 is a view illustrative of a message transmission example at trigger points 9 and 10 in accordance with an embodiment of the present invention.

Specifically, as to the trigger point 9 and the trigger point 10, referring to FIG. 8, the caller and the callee are able to talk with each other while sharing a message such as a moving image or the like. In this case, any one of the caller and the callee makes an instruction input at "the time of talking", so that a message can be transmitted.

The communication service state of a trigger point 10' is "when the answering machine picks up". As an opportunity of this trigger point, a message recorded in an answering machine service center is transmitted to the caller terminal 400*a*.

The communication service state of a trigger point 11 is "after disconnection". As an opportunity of this trigger point, for example, a message that has been forgotten to be given while talking on the telephone or data of the recorded content of talking on the telephone or the like is transmitted to the caller terminal 400*a*.

The communication service state of a trigger point 12 is also "after disconnection". As an opportunity of this trigger point, a message that has been forgotten to be given while talking on the telephone or data of the recorded content of talking on the telephone or the like is transmitted to the callee terminal 400*b*.

At the trigger points 11 and 12, an operator or service provider is able to register a message including information such as matters to be informed to users and then transmit the message to at least one of the caller terminal 400*a* and the callee terminal 400*b* at the timing of "after disconnection".

First Embodiment

Now, the first embodiment will be described with reference to the flowchart illustrated in FIG. 9 and trigger points illustrated in FIG. 6.

The caller (or callee) registers beforehand in the information storage device 300 multiple messages that the caller (or callee) desires to use depending on the situation or to who the message is selectively transmitted. Examples of such multiple messages are: "I will call you back in five minutes (message ID: 001)"; "Now I am on the train, so I will get back to you after I get off the train (message ID: 002)"; "I am not working today, so I will get back to you tomorrow morning (message ID: 003)"; and the like.

When it is impossible for the callee to answer the telephone because the callee is attending a meeting, moving, or any other situation, while the caller terminal 400*a* is making a telephone call to the callee terminal 400*b* (the trigger point 7 illustrated in FIG. 6), the callee designates the message ID by operating the callee terminal 400*b* to make an instruction input for message transmission. Thus, the callee terminal 400*b* transmits a message transmission instruction signal including the designated message ID to the communication system.

In the communication system, the IMS 100 receives the message transmission instruction signal from the callee terminal 400*b*, when the communication trigger detector 103 detects the trigger point 7 (step S101). The determination portion 104 of the IMS 100 reads out the message ID included in the message transmission instruction signal, and recognizes that the message identified by the message ID should be transmitted to the caller terminal 400*a* (step S102). The message transmitter 105 gives an instruction to the information storage device 300 to transmit the message identified by the message ID to the caller terminal 400*a* (step S103). The information storage device 300 transmits the message stored in the database in association with the message ID to the caller terminal 400*a*.

Second Embodiment

Next, the second embodiment will be described. The message to be transmitted is determined based upon the instruction input of the callee in the first embodiment, whereas in the second embodiment, the message to be transmitted is determined based upon the determination condition that has been registered beforehand. As a precondition, assuming that the table illustrated in FIG. 4 is registered beforehand by the callee in the message transmission condition memory portion 101 of the IMS 100, and "attending a meeting" that is a current state of the callee is registered in the presence DB.

The caller makes a telephone call to the callee terminal 400*b* by use of the caller terminal 400*a* having a telephone number T001.

With the above configuration, the communication trigger detector 103 of the IMS 100 detects the trigger point 7 "when the callee MS answers" (step S101). The determination portion 104 of the IMS 100 acquires "attending a meeting", which is the presence of the callee from the presence DB. Then, the message ID, which corresponds to "when the callee MS answers" that is the current service state, "attending a meeting" that is the current state of the callee, and "telephone number T001" of the caller ID of the caller terminal 400*a*, is determined to be "01" from the table illustrated in FIG. 4 (step S102). The message transmitter 105 gives an instruction to the caller terminal 400*a* to transmit the message identified by the message ID 01 that has been determined by the determination portion 104 (step S103). The information storage device 300 transmits the message stored in the database in association with the message ID 01 to the caller terminal 400*a*.

In this manner, the message ID corresponding to the caller ID is registered and the messages in accordance with the user's states are registered beforehand, whereby it is made possible to eliminate the operation for the message transmission.

Third Embodiment

In the third embodiment, an example of transmitting a fixed message registered beforehand will be described. The caller registers beforehand in the information storage device 300 messages to be transmitted, such as "I would like to make quick contact with you. Please call me back as soon as possible. (message ID: 04)", "I am making a telephone call in accordance with the emergency telephone calling tree. The content of the message is AAA. (message ID: 05)", "With respect to AAA, please give me your answer Yes or No by e-mail. (message ID: 06)", and the like. Then, the caller inputs into the caller terminal 400*a* the telephone number of the callee terminal 400*b* that is the communication counterpart, and makes a telephone call. Subsequently, the caller designates the massage ID to be transmitted and makes an instruction input for massage transmission. Thereby, the caller terminal 400*a* transmits the message transmission instruction signal to the network.

When the callee answers the telephone call, the communication trigger detector 103 of the IMS 100 detects the trigger point 10 illustrated in FIG. 6. Also, when the callee does not answer the telephone call, the communication trigger detector 103 detects the trigger point 4. Alternatively, when the telephone answering machine service center makes a response with which the callee makes a contract, the communication trigger detector 103 detects the trigger point 10' (step S101).

The IMS 100 in the communication system determines the message to be transmitted, from the message ID included in the message transmission instruction signal that has been received from the caller terminal 400*a* (step S102). The message transmitter 105 gives an instruction to the information storage device 300 to transmit the message to be identified by the message ID to the callee terminal 400*b* (step S103). The information storage device 300 transmits the message stored in the database in association with the message ID to the callee terminal 400b.

Incidentally, when making a telephone call by inputting a telephone number, the message ID may be applied to the telephone number for the telephone call. In this case, the IMS 100 of the communication system determines that it is an outgoing procedure of a message transmission request from the format of the applied number included in the message transmission instruction signal.

The messages are registered in the database beforehand in this manner, thereby eliminating the necessity of the caller repeatedly inputting the same content of the message. It is therefore possible to communicate the exact information.

Fourth Embodiment

Now, the fourth embodiment will be described with reference to the flowcharts illustrated in FIG. 9 and FIG. 10. In the fourth embodiment, a description will be given of a case where the fixed message registered beforehand is transmitted to multiple counterparts by designating a group number.

Firstly, the caller operates the caller terminal 400a to designate the message ID and a group number for transmission. This causes the caller terminal 400a to transmit the message transmission instruction signal to the communication system.

Figure 9:
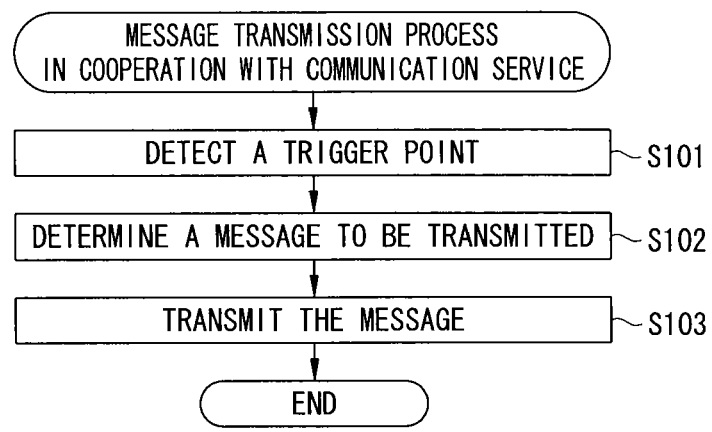
FIG. 9 is a flowchart illustrative of a process flow of message transmission processing in cooperation with a communication service in accordance with an embodiment of the present invention.

In the communication system, when the IMS 100 receives the message transmission instruction signal, the communication trigger detector 103 detects the trigger point (step S101 in FIG. 9). The procedure of detecting the trigger point is same as that of the third embodiment.

Next, the determination portion 104 determines the message to be transmitted from the message ID included in the message transmission instruction signal (step S102).

Figure 10:
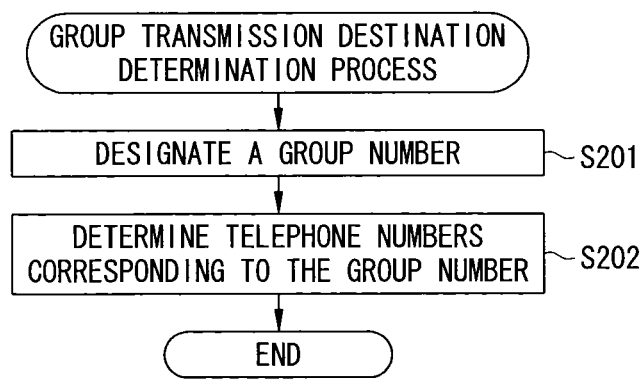
FIG. 10 is a flowchart illustrative of a process flow of a group transmission destination determination process in accordance with an embodiment of the present invention.

In addition, the message transmitter 105 determines that the group number is designated from the data format of the message transmission instruction signal, and then designates the group number included in the message transmission instruction signal (step S201 of FIG. 10). Then, the message transmitter 105 refers to the transmission destination group memory portion 102 to designate multiple telephone numbers or terminal identifiers corresponding to the group number designated at step S201 (step S202 of FIG. 10).

The message transmitter 105 transmits the messages successively or in parallel to each of the transmission destinations identified by multiple telephone numbers or terminal identifiers that have been determined (step S103 of FIG. 9). In this manner, the caller designates the group number at the time of making an instruction input for message transmission, thereby making it possible to transmit the message to multiple communication terminals corresponding to the group number. Accordingly, this allows users to save the time for successive input.

Fifth Embodiment

Next, the fifth embodiment will be described. Multiple transmission destinations are designated by the group number in the fourth embodiment, whereas in the fifth embodiment, single or multiple transmission destinations are designated from a transmission destination list.

The caller operates the caller terminal 400a to display the transmission destination list, and then makes an input for selecting one or multiple transmission destinations from the transmission destination list. This causes the caller terminal 400a to transmit the message transmission instruction signal including one or multiple telephone numbers of the transmission destinations that have been selected.

With this configuration, the message transmitter 105 of the IMS 100 transmits the message to the communication terminal or terminals identified by the single or multiple telephone numbers included in the message transmission instruction signal that has been received from the caller terminal 400a.

In the fifth embodiment, the caller has to successively designate the transmission destinations of the message. However, it is made possible to designate the transmission destination or destinations of the message in a flexible manner in accordance with the situation.

Sixth Embodiment

In the sixth embodiment, examples of transmittable messages at various trigger points will be described.

When the callee MS answers (for example, the trigger point 7 or 8 illustrated in FIG. 6), it is possible to transmit a message to the callee terminal 400b (or the caller terminal 400a) by referring to the presence information of the caller (or callee) and determining the message to be transmitted in accordance with the place, state, mood or the like of the caller (or callee). In this manner, by receiving the presence of the counterpart at the time of answering the telephone call before shifting to talking on the telephone in the message in accordance with, for example, the state of "I am busy now" or the like, the mood of "I am sad now" or the like, it is made possible to prepare for talking on the telephone.

At the time of starting communication (for example, the trigger point 9 or 10 illustrated in FIG. 6), after the message registered beforehand such as "this telephone conversation will be recorded" is played, the communication can be started. In such a case, the outgoing procedure described in the third embodiment can be used.

Also, at the timing of putting the call on hold such as catch phone (registered trademark) (for example, the trigger point 9 or 10), the message of "Hold on, please. Now I have a second call" or the like can be transmitted.

Additionally, at the time of talking on the telephone (the trigger point 9 or 10), by transmitting a message of "I am approaching a tunnel soon, so this call will be disconnected. Please wait for a moment" or the like, it is made possible to utilize as an assistance measure against weak radio wave signals. In addition, it is possible to transmit a message of "I am not able to talk to you, because I am attending a meeting now. Please just talk your reason for the call". Furthermore, it is possible to make a response by transmitting a message of "Yes" or "No". The combination of such messages to be transmitted establishes a conversation, even in a case where it is difficult to utter a word due to the surrounding situations, for example.

The message can be transmitted at the time of communication (the trigger point 9 or 10) as an opportunity of a change in the presence other than the user's instruction input. An example is that when the presence of the caller (or callee) is out of the "service area" or "when another application is activated", it is possible to transmit the message in response to the content of the presence to the callee terminal 400b (or the caller terminal 400a). In this case, the determination portion 104 determines that the presence of the caller (or callee) has changed and the presence condition for message transmission is satisfied, also determines the message to be transmitted (step S102 of FIG. 9), and then givens an instruction to the message transmitter 105 to transmit the message (step S103 of FIG. 9). The change in the presence is automatically detected by the network and the message is transmitted in this manner, thereby allowing users to save the time for making an instruction input. Moreover, even under the circumstances where it is impossible for the users to make an instruction input due to staying at an out-of-service area or working on something else, it is made possible to transmit messages promptly.

After the communication completes (trigger point 11 or 12), it is possible to represent the feelings of the caller (or callee) instead of the caller (or callee), by transmitting the message of "Sorry for this call", "Thank you, although I cannot say so directly", or the like. Incidentally, the message to be transmitted is not limited to voice or music messages in the voice and audio communication, and may be an image message to be transmitted in the communication over image communication paths. Also, at the trigger points 11 and 12, an operator or service provider registers messages including information on matters to be informed to their users, so as to transmit the messages to the users at the timing of "after disconnection". As described, at "the timing of disconnection" when it is not bothersome for users, it is possible to provide information on the communication (such as recording of talking on the telephone, billing information, or the like) or information on the operator's or service provider's circumstances (such as construction information, new service information, advice for service utilization) as a message at a timing that does not bother their users in an effective manner.

As described heretofore, when the generation of the communication service state that is an opportunity of the message transmission is detected in the course of call processing, the IMS 100 determines the message to be transmitted based upon at least one of the type of the communication service state that has been detected, the transmission destination of the message, the presence information, and the instruction input thereof, and then transmits the message to be transmitted to the transmission destination. It is therefore made possible to transmit the message in cooperation with the communication service in a flexible manner at various timings of the communication service states, thereby achieving a message transmission service in cooperation with communication.

Incidentally, only an example of the configuration of components in the communication system in the above embodiments has been described. For instance, the IMS 100 and the information storage device 300 have been described as separate apparatuses. However, the IMS 100 may be equipped with a function of storing messages. Also, multiple apparatuses may be equipped with the function of the IMS 100.

INDUSTRIAL APPLICABILITY

The present invention is applicable to a message transmission service for transmitting messages in a flexible manner in cooperation with communication services at various timings of the communication service states.

The invention claimed is:

1. A service apparatus comprising:
a storage device for storing a message to be played on either a caller terminal or a callee terminal;
a communication trigger detector for detecting a communication trigger point that represents that a communication service state has shifted and that is an opportunity of message transmission in a course of call processing including a plurality of the communication service states from starting a call, in communication including ringing, busy, and talking, and after disconnection;
a presence information change detector for detecting a change of presence information of a caller or a callee during the call between the caller terminal and the callee terminal, the presence information representing a state of the caller or the callee;
a message transmission condition memory unit for storing a plurality of the communication service states for each terminal identifier of the caller terminal and the callee terminal, a plurality of types of the presence information different from each other for each of the plurality of the communication service states, and a plurality of message identifiers corresponding to the plurality of the types of the presence information, respectively;
a message specifying unit for, when the communication trigger detector detects the communication trigger point, specifying a message identifier from the plurality of message identifiers, the communication trigger point detected by the communication trigger detector, the presence information representing the state of the caller or the callee after the change is detected by the presence information change detector, and the terminal identifier of the caller terminal or the callee terminal, by referring to the message transmission condition memory unit; and
a message transmitter for, when the communication trigger detector detects the communication trigger point, reading out the message identifier specified by the message specifying unit from the message transmission condition memory unit to transmit the message corresponding to the message identifier to either the caller terminal or the callee terminal.

2. The service apparatus according to claim 1, further comprising a message transmission condition memory portion for storing a determination condition for determining the message to be transmitted based upon at least one of a type of the communication service state, a transmission destination of the message, and the presence information relating to a user of either the caller terminal or the callee terminal,
wherein the message specifying unit specifies the message to be transmitted based upon the determination condition stored in the message transmission condition memory portion.

3. The service apparatus according to claim 1, further comprising a transmission destination group memory portion for storing a group identifier for identifying a group in association with either a plurality of user identifiers or a plurality of terminal identifiers for identifying communication terminals,
wherein information on an instruction input by the user of either the caller terminal or the callee terminal includes a message identifier for identifying the message to be transmitted and the group identifier, and
wherein the message transmitter transmits the message to a communication terminal identified by either a user identifier or a terminal identifier, which are stored in the transmission destination group memory portion in association with the group identifier.

4. The service apparatus according to claim 1, wherein the communication service state that is the opportunity of the message transmission is a state where the caller terminal and the callee terminal are communicating with each other.

5. The service apparatus according to claim 1, wherein the communication service state that is the opportunity of the message transmission is a state where the callee terminal answers a telephone call from the caller terminal.

6. The service apparatus according to claim 1, wherein the communication service state that is the opportunity of the message transmission is a state where the communication between the caller terminal and the callee terminal is disconnected.

7. The service apparatus according to claim 1, wherein a transmission destination of the message is the callee terminal.

8. A message transmission method comprising:
   storing in a storage device a message to be played on either a caller terminal or a callee terminal;
   detecting by a server apparatus a communication trigger point that represents that a communication service state has shifted and that is an opportunity of message transmission in a course of call processing including a plurality of the communication service states from starting a call, in communication including ringing, busy, and talking, and after disconnection;
   detecting a change of presence information of a caller or a callee during the call between the caller terminal and the callee terminal, the presence information representing a state of the caller or the callee;
   storing in a message transmission condition memory unit a plurality of the communication service states for each terminal identifier of the caller terminal and the callee terminal, a plurality of types of the presence information different from each other for each of the plurality of the communication service states, and a plurality of message identifiers corresponding to the plurality of the types of the presence information, respectively;
   specifying a message identifier from the plurality of message identifiers, the communication trigger point detected, the presence information representing the state of the caller or the callee after the change is detected, and the terminal identifier of the caller terminal or the callee terminal, by referring to the message transmission condition memory unit, when the communication trigger point is detected in the detecting;
   reading out the message identifier specified in the specifying from the message transmission condition memory unit, when the communication trigger point is detected in the detecting; and
   transmitting by the server apparatus the message corresponding to the message identifier read out in the reading to either the caller terminal or the callee terminal.

9. A service apparatus comprising:
   a storage device for storing a message to be played on either a caller terminal or a callee terminal;
   a communication trigger detector for detecting generation of a communication trigger point that represents a communication service state and that is an opportunity of message transmission in a course of call processing including a plurality of the communication service states from starting a call, in communication including ringing, busy, and talking, and after disconnection;
   a presence information change detector for detecting a change of presence information of a caller or a callee during the call between the caller terminal and the callee terminal, the presence information representing a state of the caller or the callee;
   a message transmission condition memory unit for storing a plurality of the communication service states for each terminal identifier of the caller terminal and the callee terminal, a plurality of types of the presence information different from each other for each of the plurality of the communication service states, and a plurality of message identifiers corresponding to the plurality of the types of the presence information, respectively;
   a message specifying unit for, when the communication trigger detector detects the communication trigger point, specifying a message identifier from the plurality of message identifiers, the communication trigger point detected by the communication trigger detector, the presence information representing the state of the caller or the callee after the change is detected by the presence information change detector, and the terminal identifier of the caller terminal or the callee terminal, by referring to the message transmission condition memory unit; and
   a message transmitter for, when the communication trigger detector detects the communication trigger point, reading out the message identifier specified by the message specifying unit from the message transmission condition memory unit to transmit the message corresponding to the message identifier to either the caller terminal or the callee terminal.

* * * * *